US012662025B2

(12) United States Patent
Chen

(10) Patent No.: US 12,662,025 B2
(45) Date of Patent: Jun. 23, 2026

(54) ADJUSTABLE PROTECTOR AND SAFETY SEAT

(71) Applicant: Bambino Prezioso Switzerland AG, Steinhausen (CH)

(72) Inventor: Hongbo Chen, Dongguan (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 243 days.

(21) Appl. No.: 17/569,233

(22) Filed: Jan. 5, 2022

(65) Prior Publication Data

US 2022/0219580 A1     Jul. 14, 2022

(30) Foreign Application Priority Data

Jan. 6, 2021     (CN) .......................... 202110017031.8

(51) Int. Cl.
B60N 2/28          (2006.01)
(52) U.S. Cl.
CPC .................................. B60N 2/2839 (2013.01)
(58) Field of Classification Search
None
See application file for complete search history.

(56) References Cited

U.S. PATENT DOCUMENTS 3,563,600 A * 2/1971 Converse ............... B60N 2/286
                                                        297/254
4,456,302 A * 6/1984 Knoedler ............. B60N 2/2839
                                                        297/464

4,634,185 A * 1/1987 Kassai ................... B60N 2/286
                                                        297/148
4,770,468 A    9/1988 Shubin
4,858,997 A * 8/1989 Shubin ................. B60N 2/2845
                                                        297/256.13
5,538,322 A    7/1996 Cone et al.
5,615,925 A * 4/1997 Kain ........................ B60N 3/10
                                                        297/188.2
5,685,604 A * 11/1997 Kain ........................... 297/250.1
5,788,326 A    8/1998 Kawade et al.
7,887,140 B1   2/2011 Forlivio
2003/0102702 A1* 6/2003 Daley .................... A47D 1/004
                                                        297/256.13

(Continued)

FOREIGN PATENT DOCUMENTS

CN          1096486 A     12/1994
CN        101274601 A     10/2008

(Continued)

OTHER PUBLICATIONS

Search Report issued in corresponding Chinese Patent Application No. 202110017031.8 on Sep. 28, 2021 consisting of 22 pp.

(Continued)

*Primary Examiner* — Anthony D Barfield
(74) *Attorney, Agent, or Firm* — Volpe Koenig

(57)          ABSTRACT

The present disclosure provides an adjustable protector including a fixing seat, a sliding portion slidably arranged on the fixing seat, and a locking mechanism arranged between the fixing seat and the sliding portion to lock or unlock the sliding portion. The adjustable protector of the present disclosure can adjust a position thereof relative to a seat body so as to adapt to children of different sizes. The present disclosure also provides a safety seat.

11 Claims, 24 Drawing Sheets

400

(56)               References Cited

U.S. PATENT DOCUMENTS

2015/0258921 A1     9/2015   Chung et al.

FOREIGN PATENT DOCUMENTS

| | | | |
|---|---|---|---|
| CN | 101670797 | A | 3/2010 |
| CN | 201951284 | U | 8/2011 |
| CN | 102309176 | A | 1/2012 |
| CN | 103054395 | A | 4/2013 |
| CN | 203766561 | U | 8/2014 |
| CN | 104044488 | A | 9/2014 |
| CN | 104290622 | A | 1/2015 |
| CN | 204687884 | U | 10/2015 |
| CN | 105015376 | A | 11/2015 |
| CN | 204749908 | U | 11/2015 |
| CN | 106114305 | A | 11/2016 |
| CN | 108297748 | A | 7/2018 |
| CN | 208682671 | U | 4/2019 |
| CN | 110356297 | A | 10/2019 |
| CN | 110962713 | A | 4/2020 |
| CN | 212195179 | U | 12/2020 |
| DE | 3922836 | A1 | 12/1989 |
| DE | 4315132 | A1 | 11/1993 |
| DE | 19850551 | C1 * | 6/2000 ........... B60N 2/2839 |
| DE | 102014103122 | B4 | 5/2019 |
| DE | 102019205122 | B4 | 9/2021 |
| GB | 2515371 | A * | 12/2014 ........... B60N 2/2839 |
| JP | 2009001136 | A | 1/2009 |
| JP | 3181756 | U | 2/2013 |
| WO | WO-03016089 | A2 * | 2/2003 ............. A47D 1/004 |

OTHER PUBLICATIONS

Office Action issued in counterpart Taiwanese Patent Application No. 111100432 dated Apr. 12, 2023.

Office Action issued in counterpart German Patent Application No. 102022100184.9 dated May 23, 2023.

Chinese Office Action issued in corresponding Application No. 202110017031.8, dated Dec. 7, 2023.

Xijuan, et al. "Design and Simulation of an Integrated Child Safety Seat" Hunan University, State Key Laboratory of Advanced Design and Manufacturing for Vehicle Body, Changsha (2009), English abstract included.

Taiwanese Office Action dated Dec. 24, 2025, issued in corresponding TW Application No. 114106838.

* cited by examiner

400

100

130     120     110     410

130

133

131

1311

1321

131

1321    1311

132

400

200

230

210

220

240

410

200

240

500

500

600

ADJUSTABLE PROTECTOR AND SAFETY SEAT

CROSS-REFERENCE TO RELATED APPLICATIONS

The present application is based on and claims the benefit of and priority to Chinese Patent Application No. 202110017031.8, filed on Jan. 6, 2021, the entire contents of which being incorporated herein by reference.

TECHNICAL FIELD

The present disclosure relates to a baby carrier, and in particular to an adjustable protector and a safety seat.

BACKGROUND

Some safety seats respectively have a structure of a protector. The protector is generally slidably inserted between a seat and an armrest, and then the protector and a seat body are wrapped around by a safety belt of the automobile, so that the protector is positioned on the seat body, thus realizing the purpose of protecting children. When different children sit in the automobile, it is only necessary to pull the adjustable protector forwards for a certain distance and then loosen the safety belt to adjust a space for the seat, since there is no connection mechanism between the protector and the seat body.

DETAILED DESCRIPTION

In order to explain the technical contents, structural features and achieved effects of the present disclosure in detail, the following detailed description will be made in combination with the embodiments and accompanying drawings.

The safety seat in the related art may adjust a space for the seat by pulling the adjustable protector forwards for a certain distance and then loosen the safety belt. However, since the protector may be separated from the seat body, the positioning of the protector in the above adjustment method is unreliable and it is prone to unexpected situations. At present, there is a safety seat in which the protector may be fixed between the seat and the armrest by providing a detachable connecting mechanism at the rear end of the protector. However, in this way of connection, the protector cannot be adjusted relative to the seat body, resulting in an un-adjustable seating space of the safety seat.

Thus, this kind of safety seat cannot adapt to the children of different ages in different sizes, i.e., it is not suitable for a child with a larger size. Thus, the present disclosure provides a safety seat, which solves or at least relieves the above problem in the related art.

Figure 1:
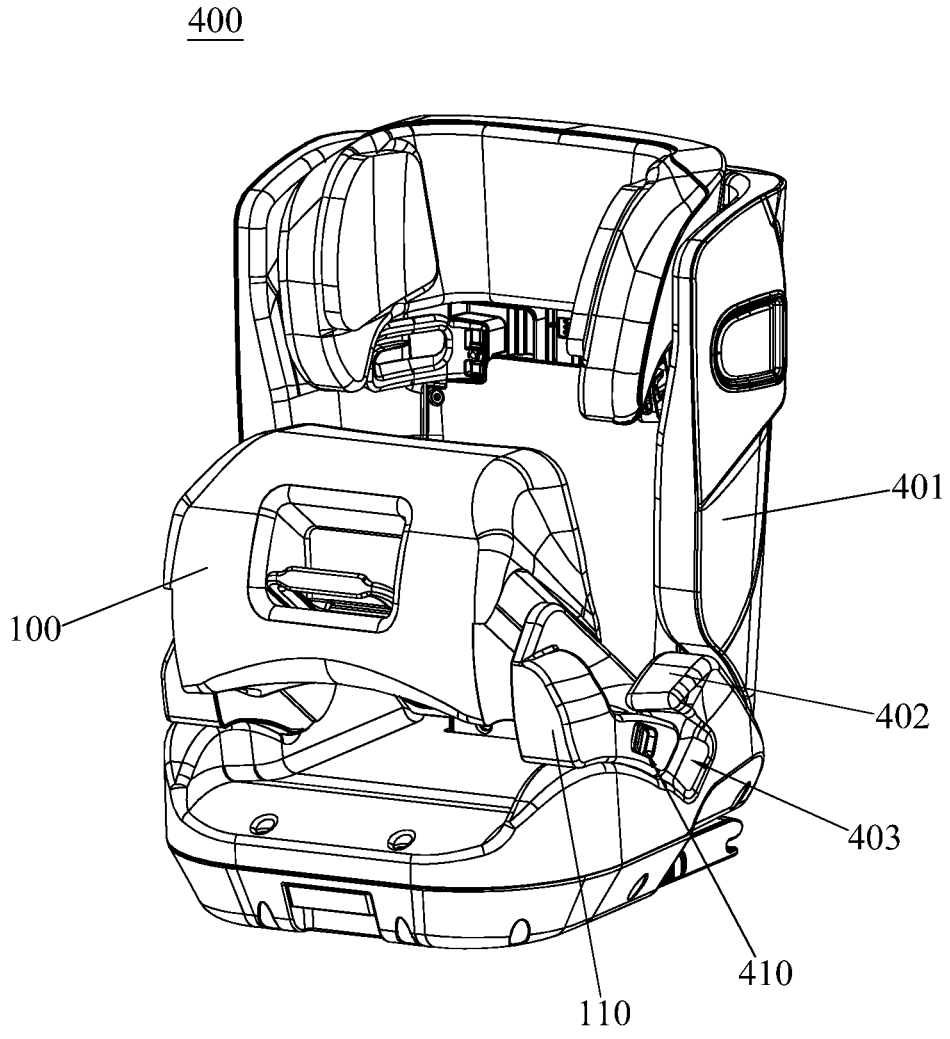
FIG. 1 is a perspective view of a safety seat according to a first embodiment of the present disclosure.

As shown in FIG. 1, a safety seat 400 of the present disclosure includes a seat body 401 and an adjustable protector 100. Armrests 402 are arranged on both sides of the seat body 401. An accommodating groove 403 is arranged between the armrest 402 and the seat body 401, and includes a connecting rod at an inner bottom of the accommodating groove 403. The adjustable protector 100 is inserted into the accommodating groove 403, and fastening mechanisms 410 (such as a buckle mechanism, a snap-fit mechanism, or the like) are arranged on both sides of the adjustable protector 100. The fastening mechanism 410 may be detachably connected to the connecting rod, so that a space for a child to seat is formed between the adjustable protector 100 and the seat body 401.

Figure 2:
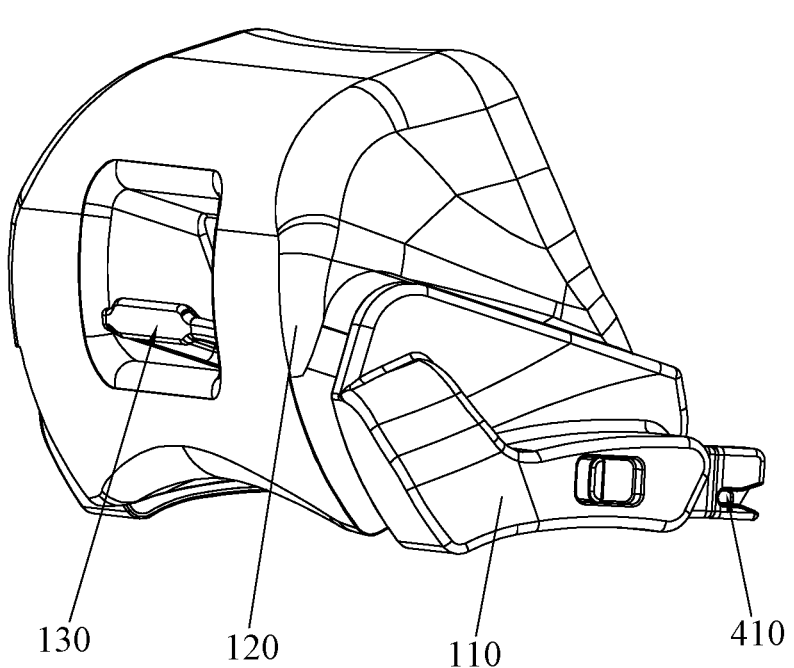
FIG. 2 is a perspective view of a protector of the safety seat according to the first embodiment of the present disclosure.
Figure 3:
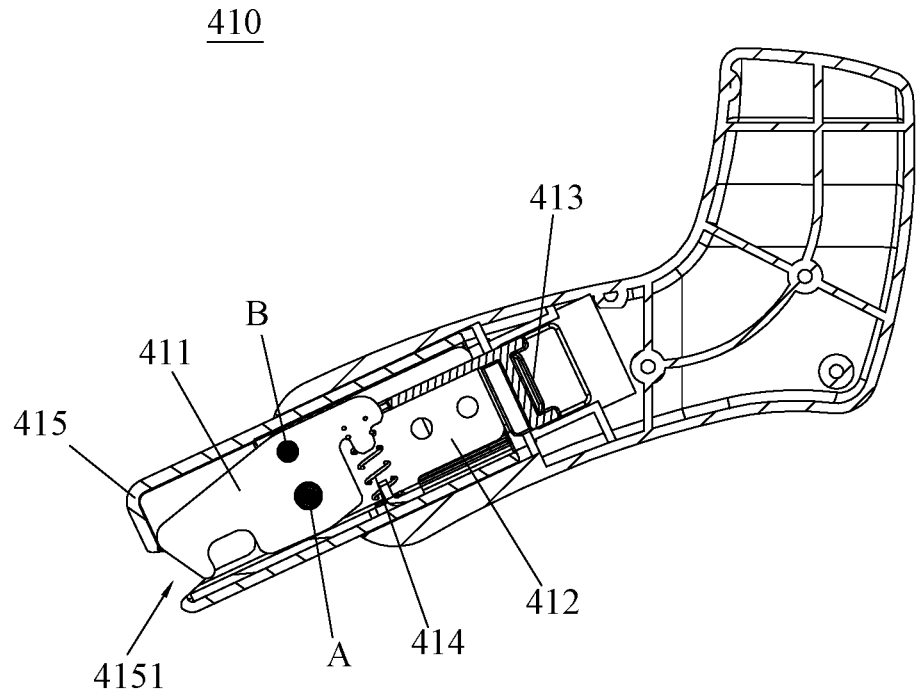
FIG. 3 is a structural view of a fastening mechanism of the safety seat according to the first embodiment of the present disclosure.

Further, as shown in FIGS. 2 and 3, the fastening mechanism 410 may include an engaging hook 411, a reinforcing member 412, a push button 413 and a reset elastic member 414. The reinforcing member 412 is fixed to a housing 415 which includes an opening 4151 for accommodating a connecting rod. The engaging hook 411 is pivotally connected to the reinforcing member 412 of the adjustable protector 100 at a pivot point A, and the push button 413 is slidably arranged on the reinforcing member 412 and pivotally connected to the engaging hook 411 at a pivot point B, so that the engaging hook 411 may be pulled to swing so as to close or open the opening 4151. The reset elastic member 414 is arranged between the housing 415 and the engaging hook 411, and provides an elastic force to drive the engaging hook 411 to be rotated to a position of closing the opening 4151.

As shown in FIGS. 1 to 6, a structure of an adjustable protector 100 according to a first embodiment of the present disclosure is shown.

Figure 4:
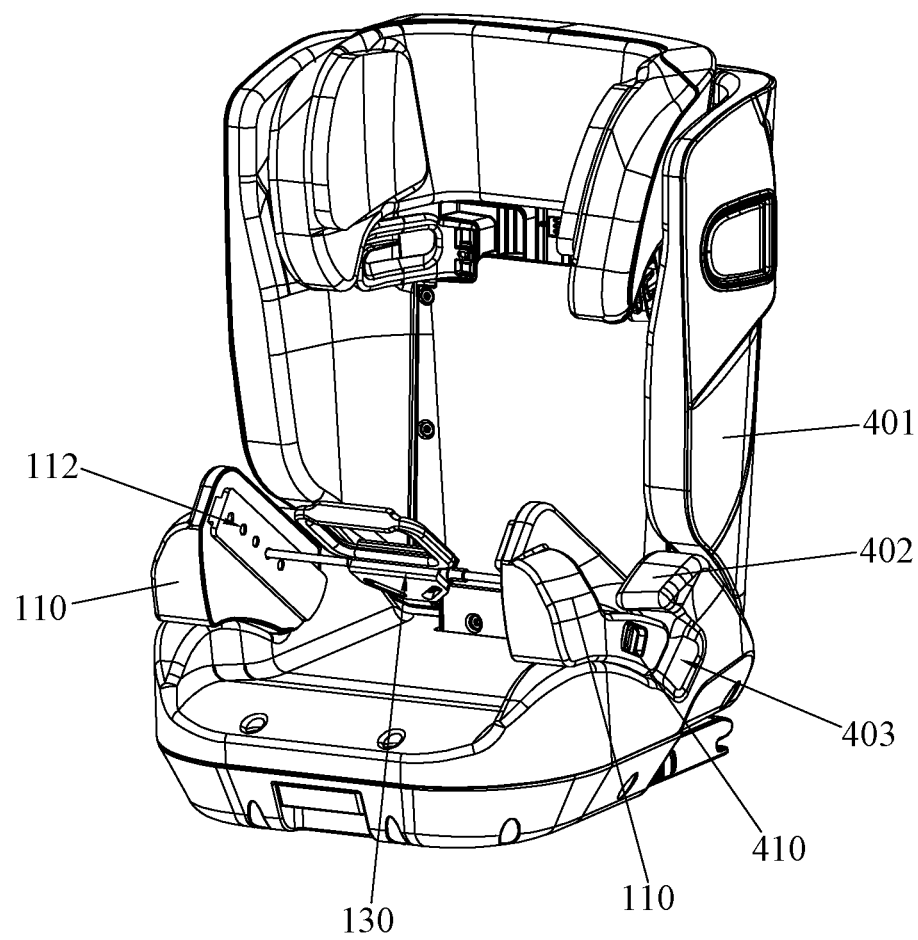
FIG. 4 is a state diagram of cooperation between a locking mechanism and a fixing seat according to the first embodiment of the present disclosure.
Figure 5:
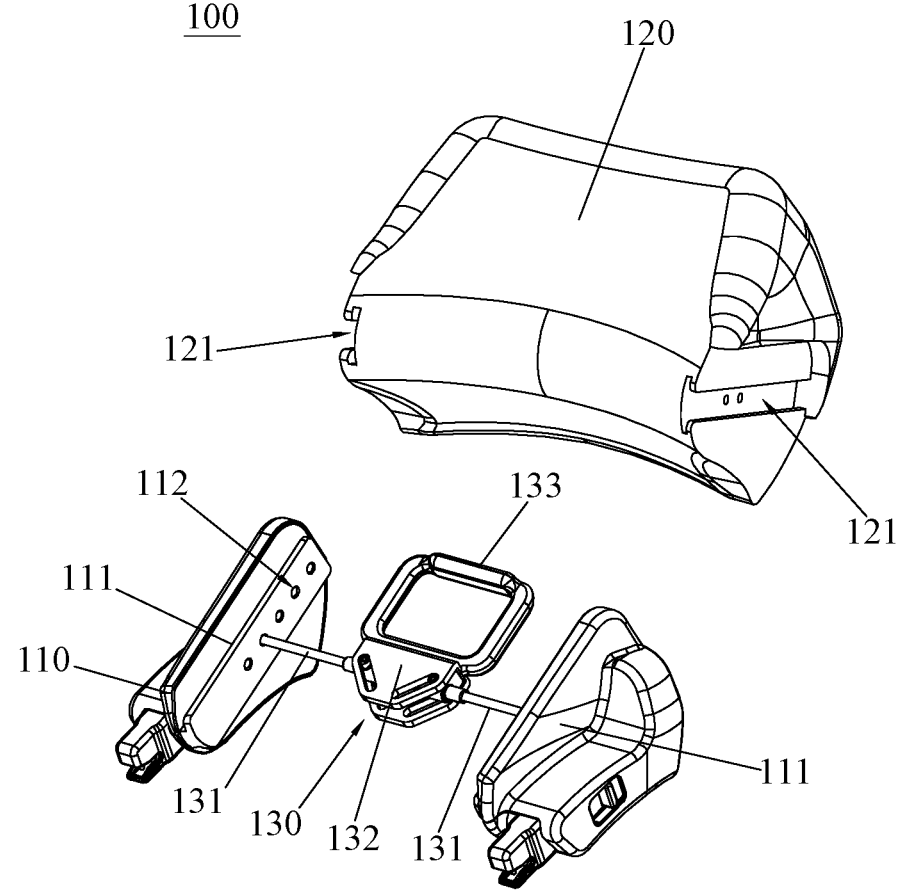
FIG. 5 is an exploded view of the protector according to the first embodiment of the present disclosure.

Referring to FIGS. 4 and 5, the adjustable protector 100 of this embodiment includes a fixing seat 110, a sliding portion 120 and a locking mechanism 130. The sliding portion 120 is slidably arranged on the fixing seat 110 along a direction of ascending from back to front, and the locking mechanism 130 is arranged between the fixing seat 110 and the sliding portion 120 to lock or unlock the sliding portion 120. Specifically, one of the fixing seat 110 and the sliding portion 120 is provided with a guide groove 121 on a side surface thereof, and the other of the fixing seat 110 and the sliding portion 120 is provided with a guide rail 111 on a side surface thereof. The guide rail 111 extends along a direction ascending from back to front, and the guide groove 121 slidably fits with the guide rail 111. In this embodiment, the guide rail 111 is provided on each of both sides of the fixing seat 110, and a guide groove 121 is provided on each of both sides of the sliding portion 120. In this way, the sliding portion 120 may slide along the ascending direction while it slides forwards, so that a width and a height of a usage area of the safety seat 400 can be adjusted.

Figure 6:
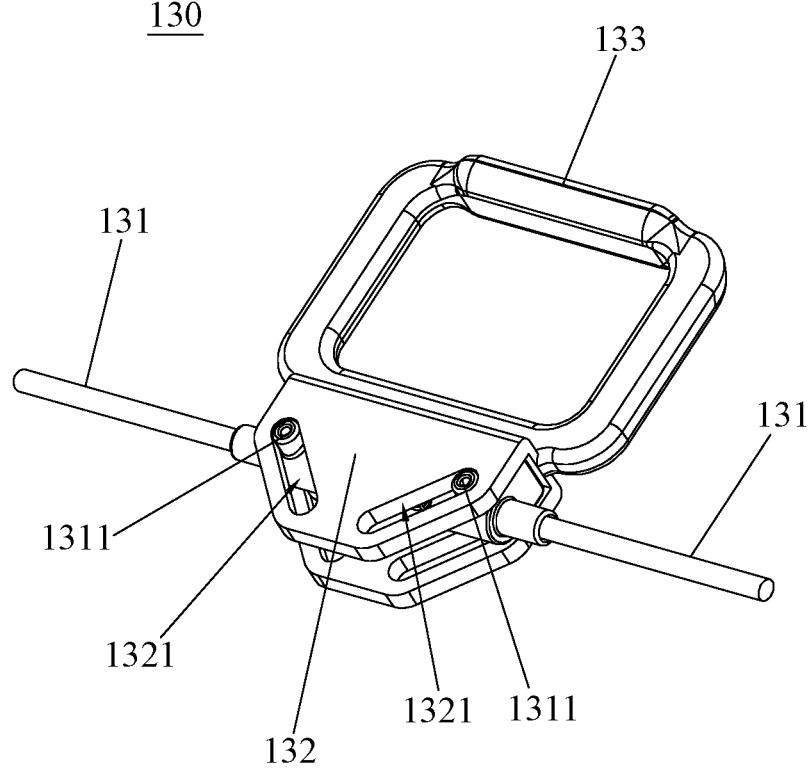
FIG. 6 is a structural view of the locking mechanism of the protector according to the first embodiment of the present disclosure.
Figure 7:
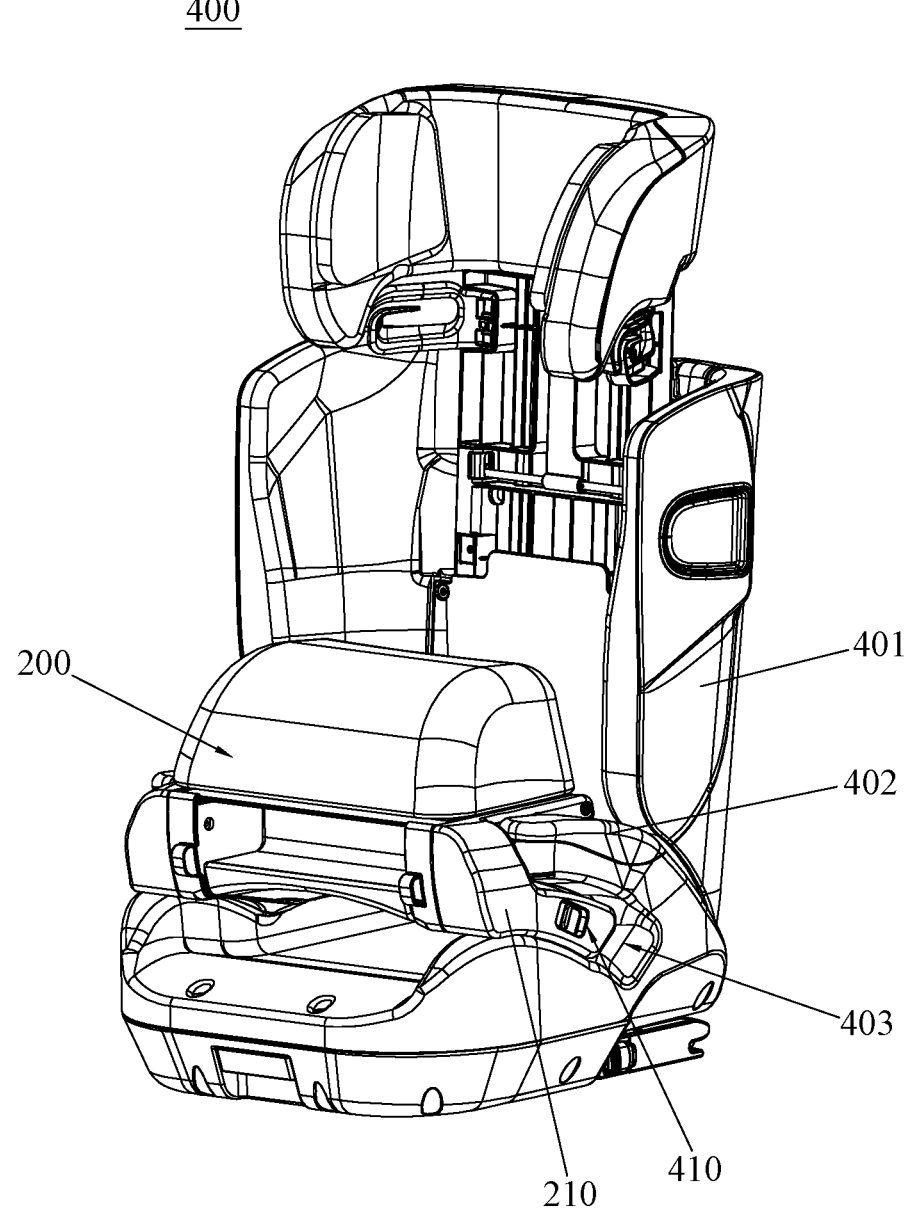
FIG. 7 is a perspective view of a safety seat according to a second embodiment of the present disclosure.

Further referring to FIGS. 5 and 6, the locking mechanism 130 includes two engaging rods 131, a driving block 132, an operating member 133 and an elastic element (not shown). Each of the engaging rods 131 is slidably arranged on the sliding portion 120, the fixing seat 110 is provided with at least two engaging holes 112 along the direction ascending from back to front, and each of the engaging rods 131 is selectively inserted into one of the engaging holes 112. Specifically, the driving block 132 is slidably arranged on the sliding portion 120, and has a sliding direction intersecting with a sliding direction of the engaging rod 131. In this embodiment, the two sliding directions are perpendicular to each other. The driving block 132 is provided with two driving chutes 1321. Extending directions of the two driving chutes 1321 are symmetrically arranged. One end of the engaging rod 131 is fixedly provided with a sliding pin 1311. The sliding pin 1311 has a central axis that is perpendicular to a central axis of the engaging rod 131, and is slidably inserted into the driving chute 1321. The operating member 133 is connected to the driving block 132 and may pull the driving block 132 to move. The elastic element is arranged between the sliding portion 120 and the engaging rod 131, and provide an elastic force to insert the engaging rod 131 into the engaging hole 112. The elastic element may be a compression spring. With the cooperation of the engaging rod 131 and the engaging hole 112, the sliding portion 120 may be locked on a position to be adjusted. In this way, the present disclosure has a simple structure and is convenient to operate. With the cooperation of the driving chute 1321 on the driving block 132 and the sliding pin 1311, a driving force of the driving block 132 along a front-back direction may be transmitted to the engaging rods 131 which move along a left-right direction, so that the engaging rods 131 may move out of the engaging hole 112 to achieve unlocking. The operating member 133 may be arranged to make it easier for users to operate and improve the convenience of use.

When a position of the protector 100 is required to be adjusted, it is only necessary to manually pull the operating member 133, so that the operating member 133 drives the driving block 132 to move, and the driving block 132 drives the two engaging rods 131 out of the engaging holes 112 through the two driving chutes 1321 and the sliding pin 1311. At this time, the sliding portion 120 is in an unlocked state, and the sliding portion 120 may slide relative to the fixing seat 110. Then, after the position of the sliding portion 120 is adjusted, the operating member 133 is released, so that the engaging rod 131 extends into another corresponding engaging hole 112, then the sliding portion 120 is locked again, and the adjustment can be completed.

Compared with the related art, the present disclosure provides a sliding portion 120 and a locking mechanism 130, wherein the sliding portion 120 may be slidably arranged on the fixing seat 110 along the direction ascending from back to front, and the locking mechanism 130 is applied to lock the sliding portion 120, so that the sliding portion 120 may move forwards and upwards relative to the fixing seat 110, and the position of the protector 100 relative to the seat body 401 of the safety seat 400 can be adjusted so as to adjust the space where legs and abdomen of a child are located, and achieve the objective of adapting to children of different sizes. The present disclosure has a simple structure and is convenient to use.

As shown in FIGS. 7 to 13, a structure of an adjustable protector 200 according to a second embodiment of the present disclosure is shown.

Figure 8:
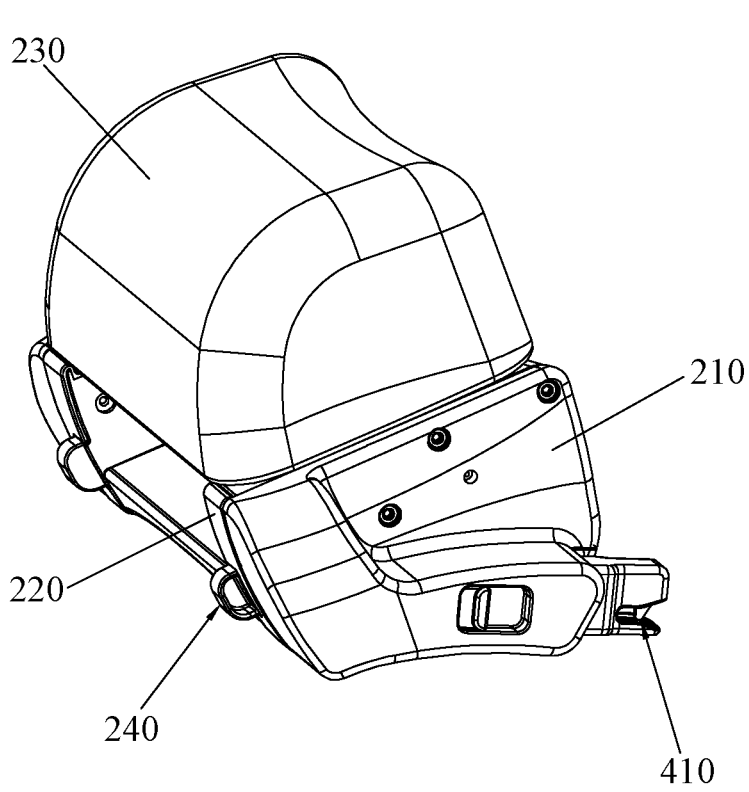
FIG. 8 is a perspective view of a protector of the safety seat according to the second embodiment of the present disclosure.
Figure 9:
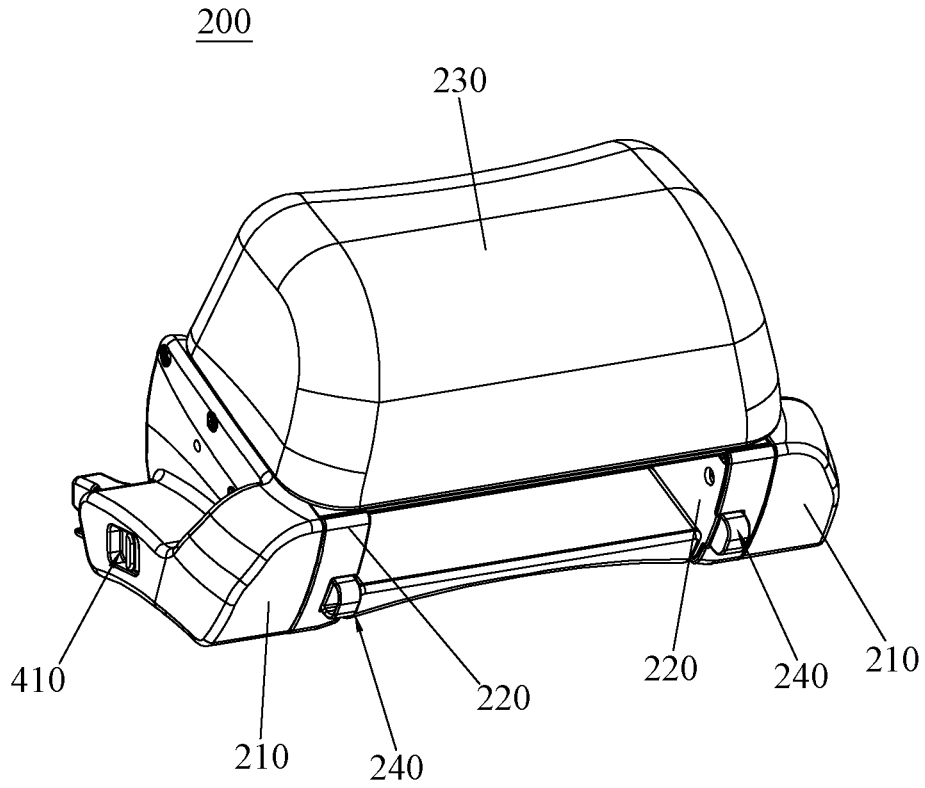
FIG. 9 is another perspective view of the protector of the safety seat according to the second embodiment of the present disclosure.
Figure 10:
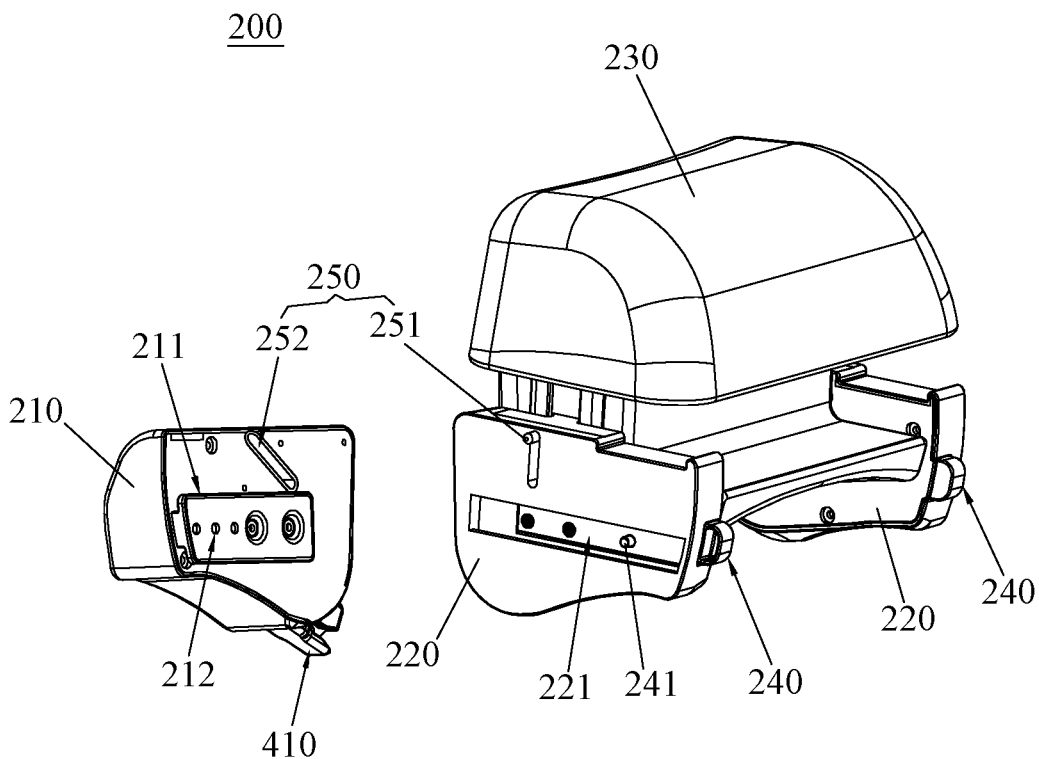
FIG. 10 is an exploded view of a fixing seat and a sliding portion of the protector according to the second embodiment of the present disclosure.

Referring to FIGS. 8 to 10, the adjustable protector 200 of this embodiment includes a fixing seat 210, a sliding portion 220, a body portion 230 and two locking mechanisms 240. The sliding portion 220 is slidably arranged on the fixing seat 210 along a front-back direction, the body portion 230 is slidably arranged on the sliding portion 220 along an up-down direction, and the locking mechanisms 240 are respectively arranged on both sides of the sliding portion 220 to lock or unlock the sliding portion 220 and the body portion 230.

Figure 11:
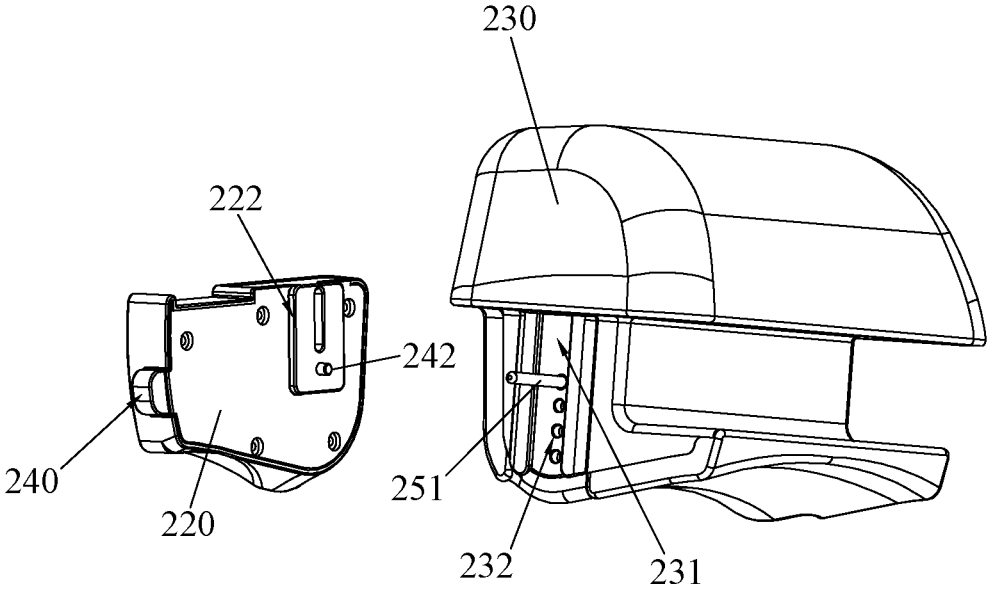
FIG. 11 is an exploded view of the sliding portion and a body portion of the protector according to the second embodiment of the present disclosure.

Further referring to FIGS. 10 and 11, specifically, one of the fixing seat 210 and the sliding portion 220 is provided with a first guide groove 221 on a side surface thereof, and the other of the fixing seat 210 and the sliding portion 220 is provided with a first guide rail 211 on a side surface thereof. The first guide groove 221 slidably fits with the first guide rail 211. In this embodiment, the fixing seat 210 is provided with the first guide rail 211 at an inner side thereof, and the sliding portion 220 is provided with the first guide grooves 221 respectively at both sides thereof. In this way, the sliding portion 220 may slide forwards, thereby realizing a front-back width adjustment of the usage area of the safety seat 400. One of the sliding portion 220 and the body portion 230 is provided with a second guide groove 231 at a side surface thereof, the other of the sliding portion 220 and the body portion 230 is provided with a second guide rail 222 at a side surface thereof, and the second guide groove 231 slidably fits with the second guide rail 222. In this embodiment, the sliding portion 220 is provided with the second guide rail 222 at an inner side thereof, and the body portion 230 is provided with the second guide grooves 231 respectively at both sides thereof. In this way, the body portion 230 may slide upwards, thereby realizing a height adjustment of the usage area of the safety seat 400.

Figure 12:
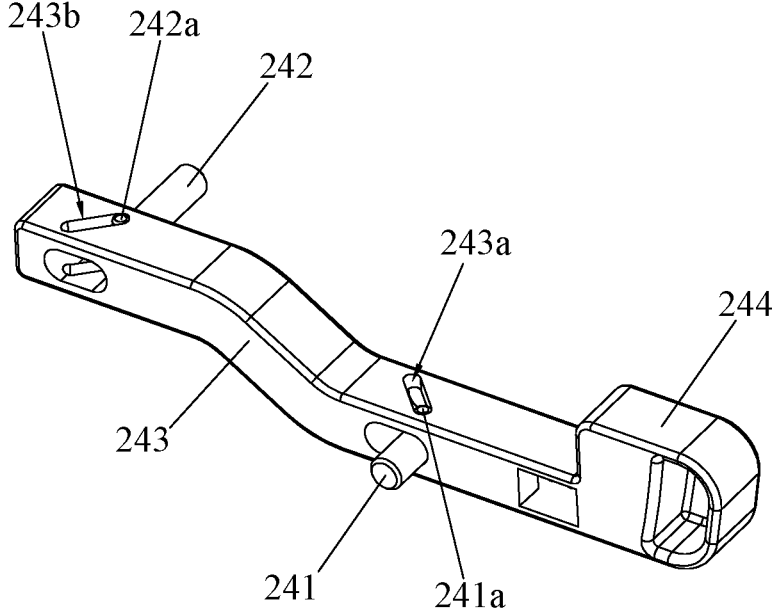
FIG. 12 is a perspective view of a driving rod of the protector according to the second embodiment of the present disclosure.
Figure 13:
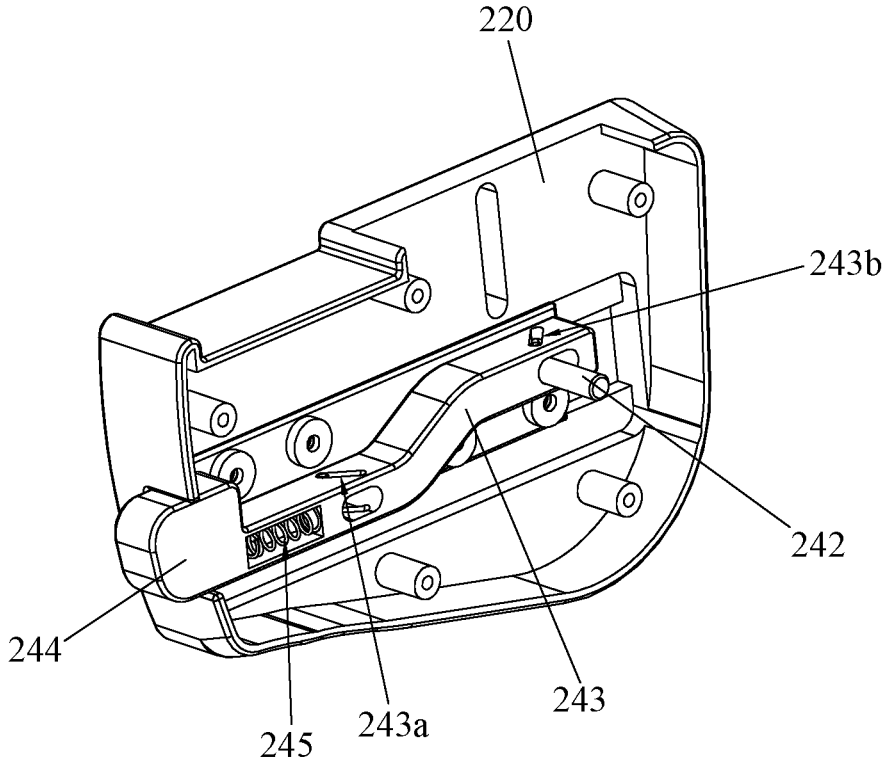
FIG. 13 is an internal structural view of the sliding portion of the protector according to the second embodiment of the present disclosure.

Referring to FIGS. 10, 12 and 13, the locking mechanism 240 includes a first locking rod 241, a second locking rod 242, a driving rod 243, an operating member 244 and a reset spring 245. The first locking rod 241 and the second locking rod 242 are slidably arranged on the sliding portion 220. The fixing seat 210 is provided with at least two first engaging holes 212 along the front-back direction, and the first locking rod 241 is selectively inserted into one of the first engaging holes 212. The body portion 230 is provided with at least two second engaging holes 232 along the up-down direction, and the second locking rod 242 is selectively inserted into one of the second engaging holes 232. With the respective cooperation of the first locking rod 241 and the second locking rod 242 with the first engaging hole 212 and the second engaging hole 232, the sliding portion 220 and the body portion 230 can be locked at a position to be adjusted, so that the present disclosure has a simple structure and is convenient to operate. The driving rod 243 is slidably arranged on the sliding portion 220, and has a sliding direction intersecting with sliding directions of the first locking rod 241 and the second locking rod 242. In this embodiment, the sliding direction of the driving rod 243 is perpendicular to the sliding directions of the first locking rod 241 and the second locking rod 242. The driving rod 243 is provided with a first driving chute 243a and a second driving chute 243b. One end of the first locking rod 241 is fixedly provided with a first sliding pin 241a, and a central axis of the first sliding pin 241a is perpendicular to a central axis of the first locking rod 241. The first sliding pin 241a is slidably inserted into the first driving chute 243a. One end of the second locking rod 242 is fixedly provided with a second sliding pin 242a, and a central axis of the second sliding pin 242a is perpendicular to a central axis of the second locking rod 242. The second sliding pin 242a is slidably inserted into the second driving chute 243b. With the respective cooperation of the first driving chute 243a and the second driving chute 243b on the driving rod 243 with the first sliding pin 241a and the second sliding pin 242a, a front-back driving force of the driving rod 243 may be transmitted to the first locking rod 241 and the second locking rod 242 that move along the left-right direction, so that the first locking rod 241 and the second locking rod 242 move out of the first engaging hole 212 and the second engaging hole 232, thereby realizing unlocking. The operating member 244 is connected to the driving rod 243. The operating member 244 may be arranged to make it easier for users to operate and improve the convenience of use. The reset spring 245 is arranged between the sliding portion 220 and the driving rod 243, and provides an elastic force to drive the first locking rod 241 and the second locking rod 242 to extend into the corresponding engaging holes through the driving rod 243. The reset spring 245 is a compression spring.

Further referring to FIG. 10, a driving mechanism 250 for driving the body portion 230 to move upwards and downwards is arranged between the body portion 230 and the fixing seat 210. Specifically, the driving mechanism 250 includes a driving pin 251 and a guide chute 252. The guide chute 252 is arranged at a side surface of the fixing seat 210 and extends along the direction ascending from back to front. One end of the driving pin 251 is fixed to the body portion 230, and the other end of the driving pin 251 is slidably inserted into the guide chute 252 through an elongated hole of the sliding portion 220. With the cooperation of the driving pin 251 and the guide chute 252, the body portion 230 may rise or fall along an extending direction of the guide chute 252 while it slides back and forth with the sliding portion 220, thereby realizing a height adjustment of the body portion 230. Thus, the present disclosure has a simple structure, that the sliding portion 220 and the body portion 230 move synchronously makes the operation more convenient.

When a position of the protector 200 is required to be adjusted, it is only necessary to manually pull the two operating members 244, and the two operating members 244 may drive the corresponding driving blocks to move, so that the driving blocks may drive both the first locking rod 241 and the second locking rod 242 out of the first engaging hole 212 and the second engaging hole 232 respectively through the first driving chute 243a, the second driving chute 243b, the first sliding pin 241a and the second sliding pin 242a. At this time, the sliding portion 220 and the body portion 230 are in an unlocked state, the sliding portion 220 may slide back and forth relative to the fixing seat 210, and at the same time, the body portion 230 may slide upwards and downwards relative to the sliding portion 220. After that, a position of the sliding portion 220 is adjusted, and a position of the body portion 230 will be synchronously slidably adjusted under the action of the guide chute 252. Finally, after the adjustment is completed, the operating member 244 is released, so that the first locking rod 241 and the second locking rod 242 extend into other corresponding engaging holes, and then the sliding portion 220 is re-locked, and the adjustment is completed.

Compared with the related art, the present disclosure provides a sliding portion 220, a body portion 230 and a locking mechanism 240, wherein the sliding portion 220 may be slidably arranged on the fixing seat 210 from back to front, the body portion 230 may be slidably arranged on the sliding portion 220 along the up-down direction, and the sliding portion 220 and the body portion 230 are simultaneously locked by the locking mechanism 240. In this way, the sliding portion 220 may move forwards relative to the fixing seat 210, at the same time the body portion 230 may move upwards relative to the sliding portion 220, and the protector 200 may be adjusted with respect to a and rear width and a height of the seat body 401 of the safety seat 400, so as to adjust the space where legs and abdomen of a child are located, and achieve the objective of adapting to children of different sizes. Thus, the present disclosure has a simple structure and is convenient to use.

Figure 14:
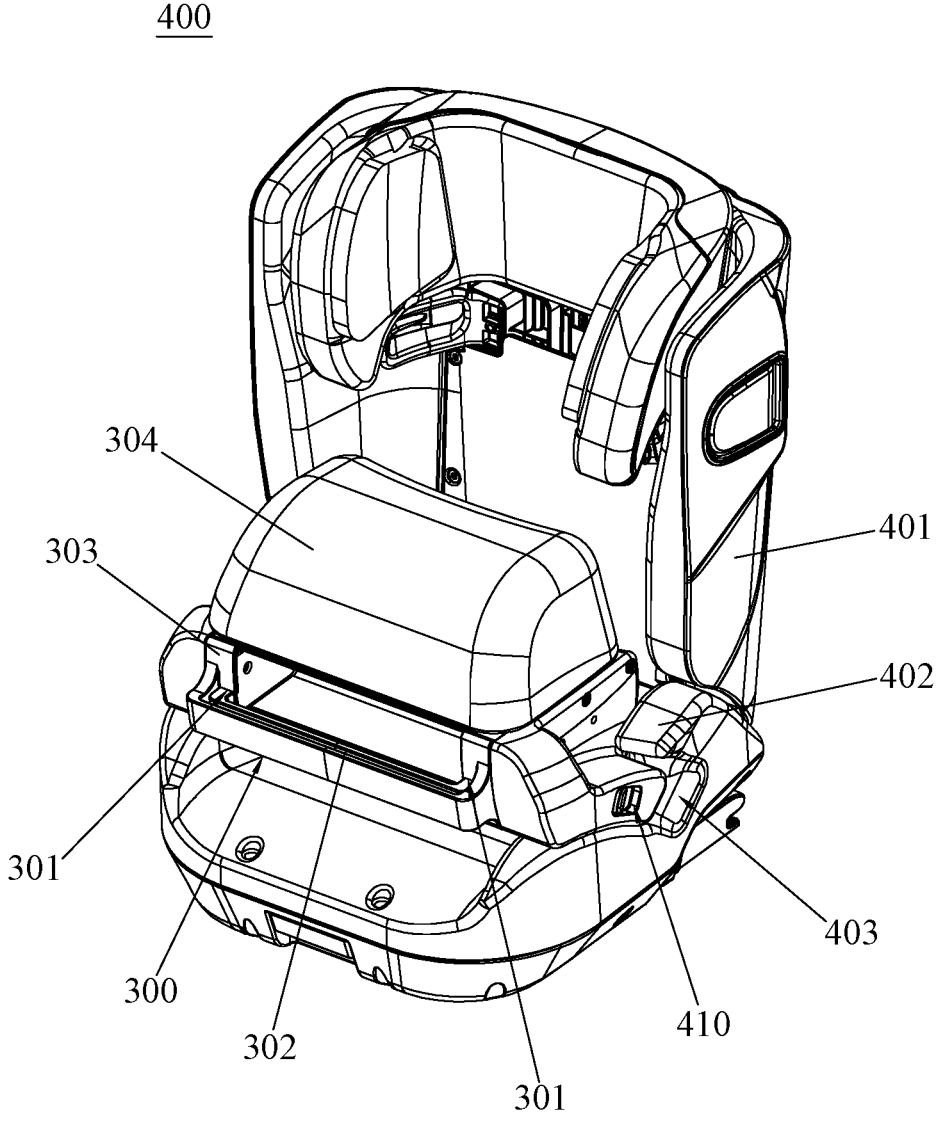
FIG. 14 is a perspective view of a safety seat according to a third embodiment of the present disclosure.
Figure 15:
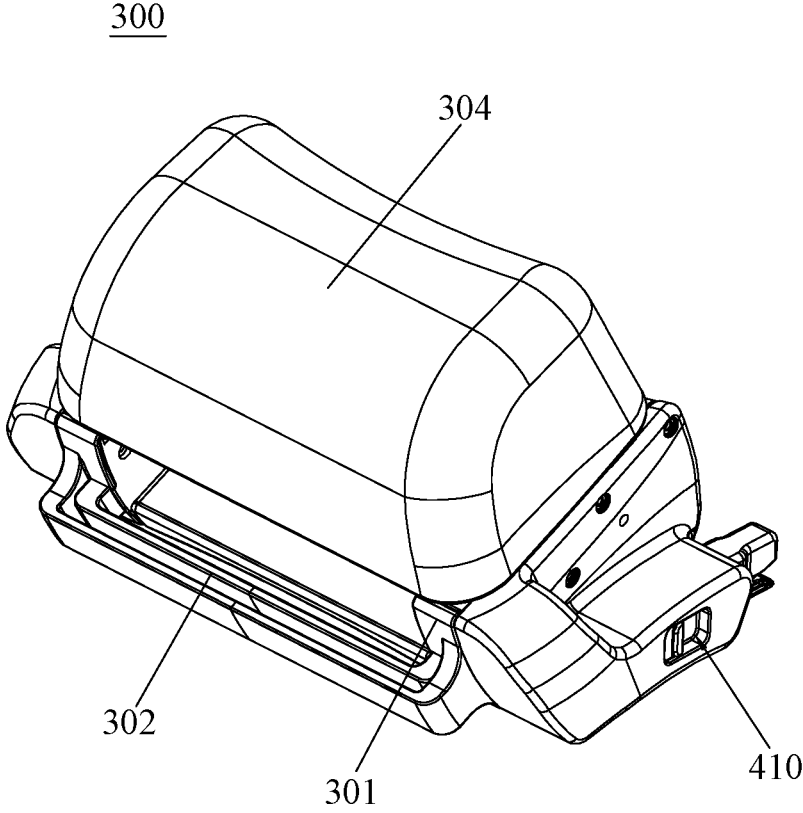
FIG. 15 is a perspective view of a protector of the safety seat according to the third embodiment of the present disclosure.
Figure 16:
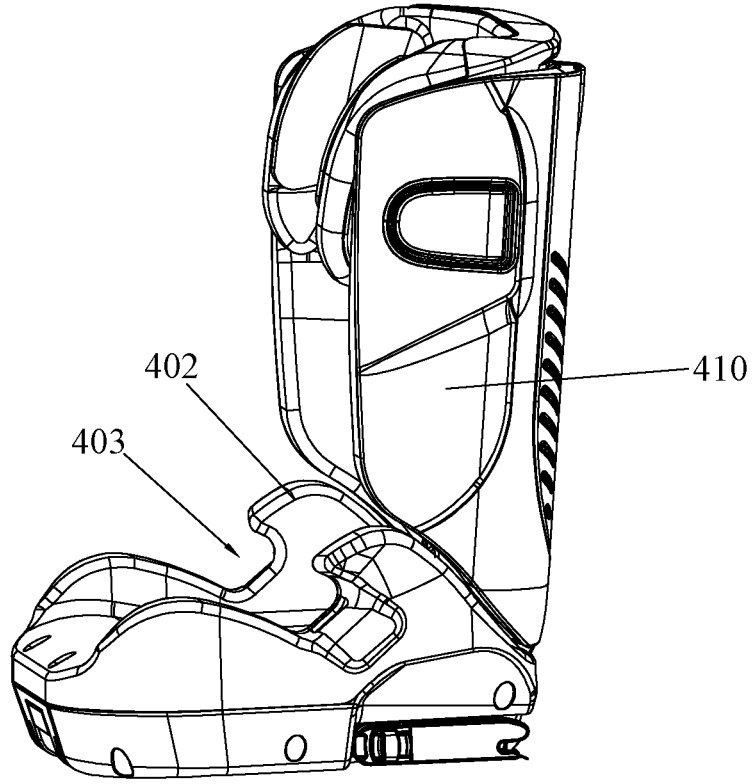
FIG. 16 is a perspective view of a seat body of the safety seat according to the third embodiment of the present disclosure.

As shown in FIGS. 14 to 16, a structure of an adjustable protector 300 according to a third embodiment of the present disclosure is shown.

The structure of the protector 300 of this embodiment is substantially the same as that of the second embodiment. However, in the second embodiment, two operating members of the protector are separately arranged, and the two operating parts need to be operated by both hands at the same time, so that the locking mechanisms at both sides can simultaneously unlock the sliding portion and the body portion; while in this third embodiment, the operating members 302 on the two locking mechanisms 301 of the protector 300 are connected together to form an integral structure. In operation, only one hand is needed to operate the integrated operating member 302, so that the locking mechanisms 301 at both sides can simultaneously unlock the sliding portion 303 and the body portion 304, further improving the convenience of operation. The functions of other components in this embodiment are the same as those of the corresponding components in the above-mentioned second embodiment, and will not be repeated herein.

As shown in FIGS. 17 to 21, a structure of an adjustable protector 500 according to a fourth embodiment of the present disclosure is shown.

Figure 17:
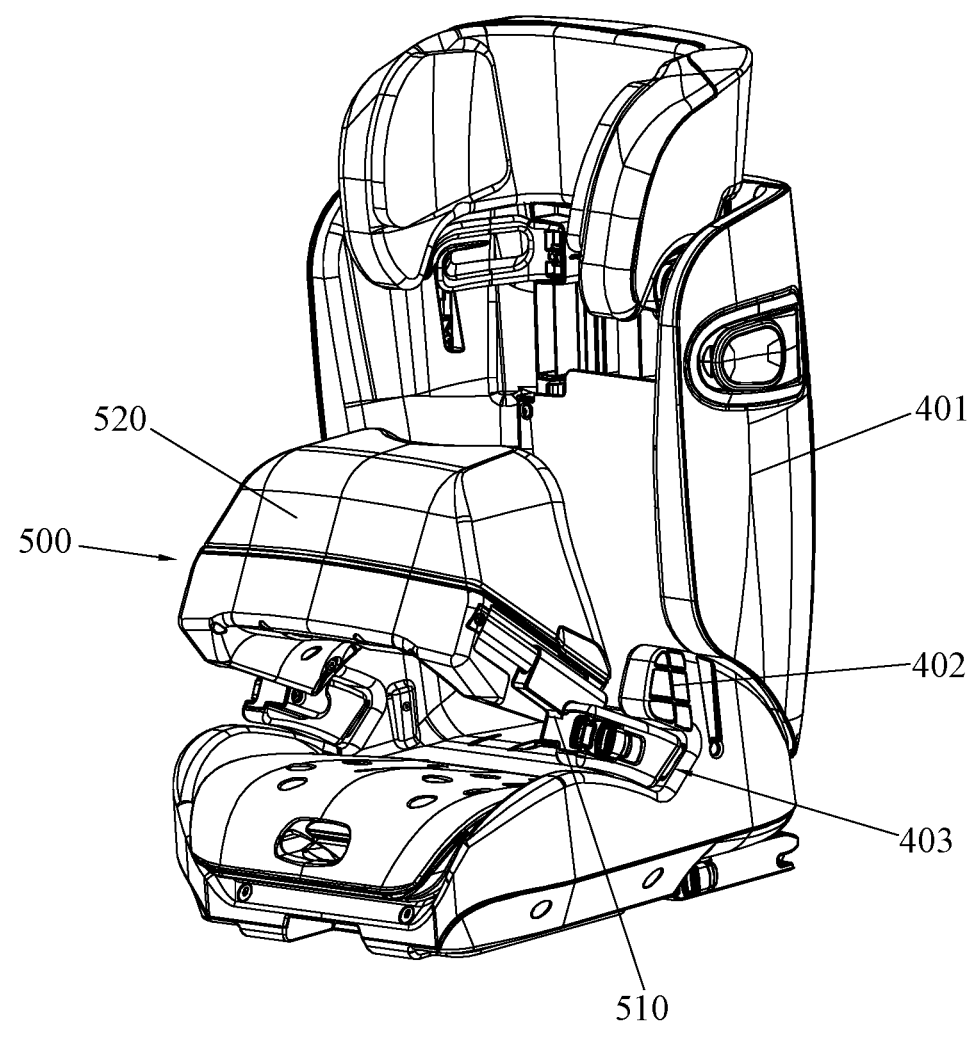
FIG. 17 is a perspective view of a safety seat according to a fourth embodiment of the present disclosure.
Figure 18:
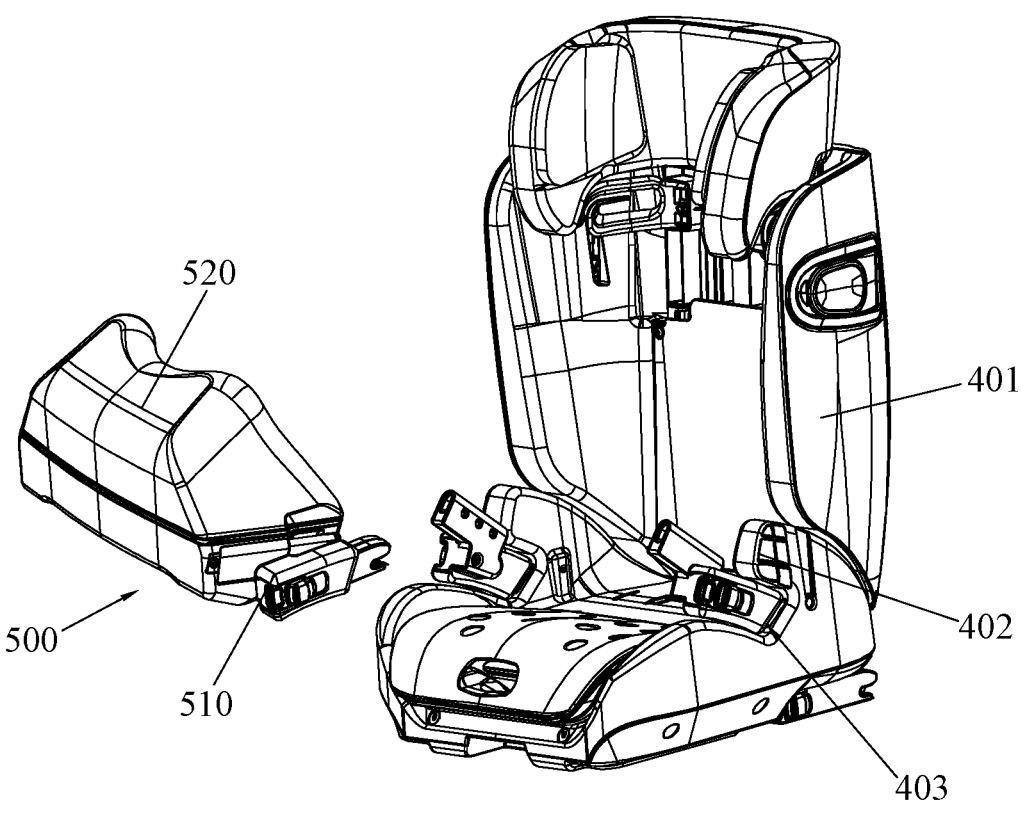
FIG. 18 is an exploded view of a protector and a seat body of the safety seat according to the fourth embodiment of the present disclosure.
Figure 19:
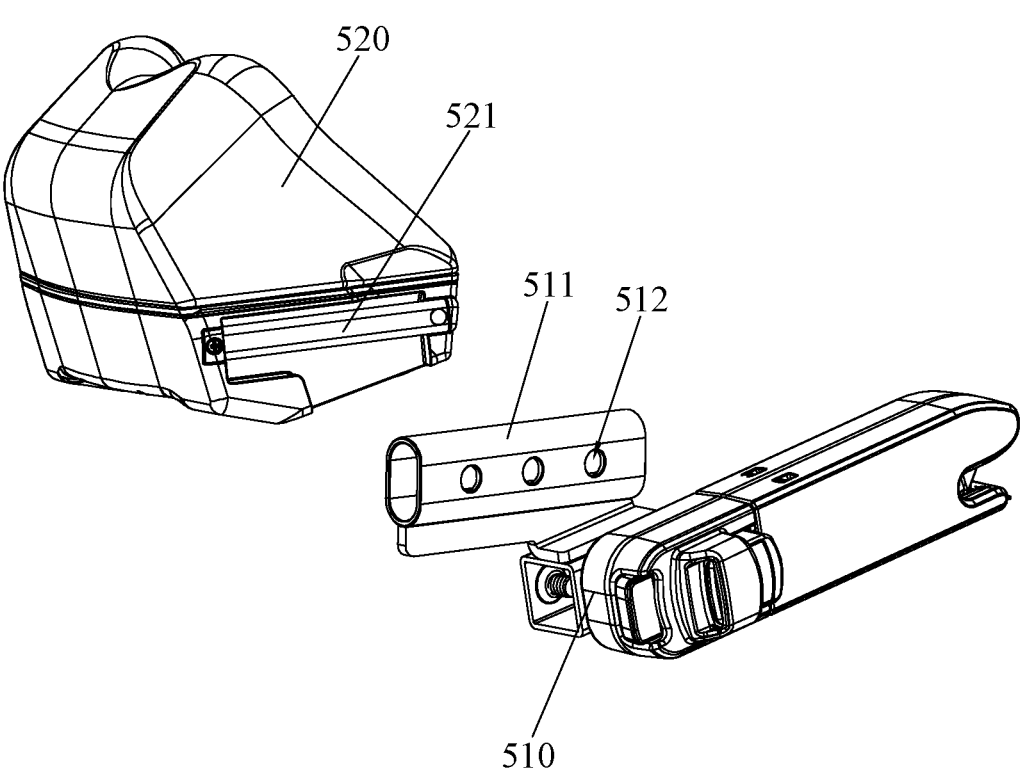
FIG. 19 is an exploded view of a fixing seat and a sliding portion of the safety seat according to the fourth embodiment of the present disclosure.

Referring to FIGS. 17 to 19, the adjustable protector 500 of this embodiment is similar to that of the first embodiment, and includes a fixing seat 510, a sliding portion 520 and a locking mechanism 530. The sliding portion 520 is slidably arranged on the fixing seat 510 along a direction ascending from back to front. The locking mechanism 530 is arranged between the fixing seat 510 and the sliding portion 520 to lock or unlock the sliding portion 520. The fixing seat 510 is provided with a guide groove 521 at a side surface thereof, and the guide groove is a sliding pipe. The sliding portion 520 is provided with a guide rail 511 extending along the direction ascending from back to on a side surface thereof, and the guide rail 511 is a fixing pipe. The sliding pipe is slidably sleeved outside the fixing pipe.

Figure 20:
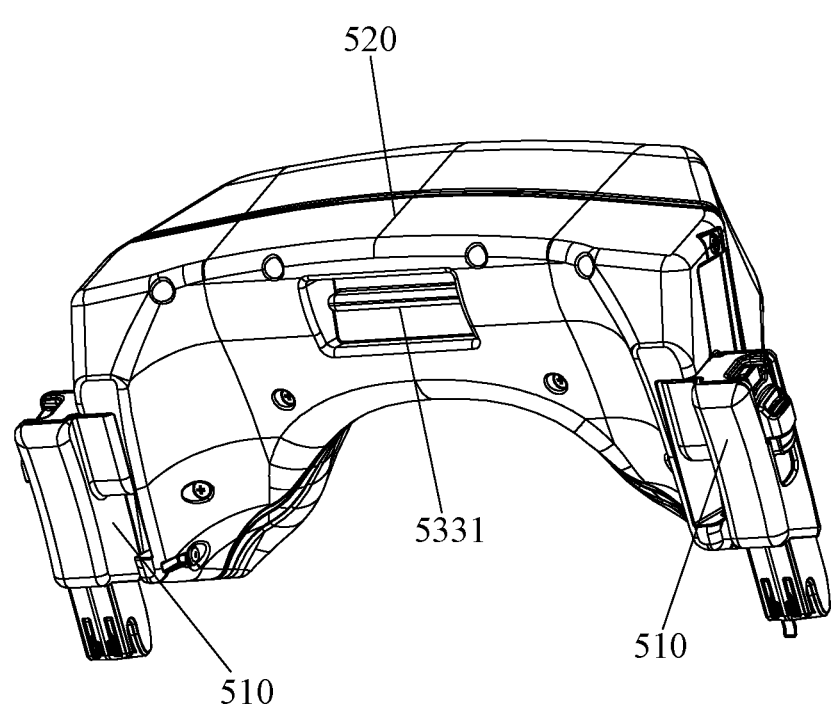
FIG. 20 is a perspective view of the protector of the safety seat according to the fourth embodiment of the present disclosure.
Figure 21:
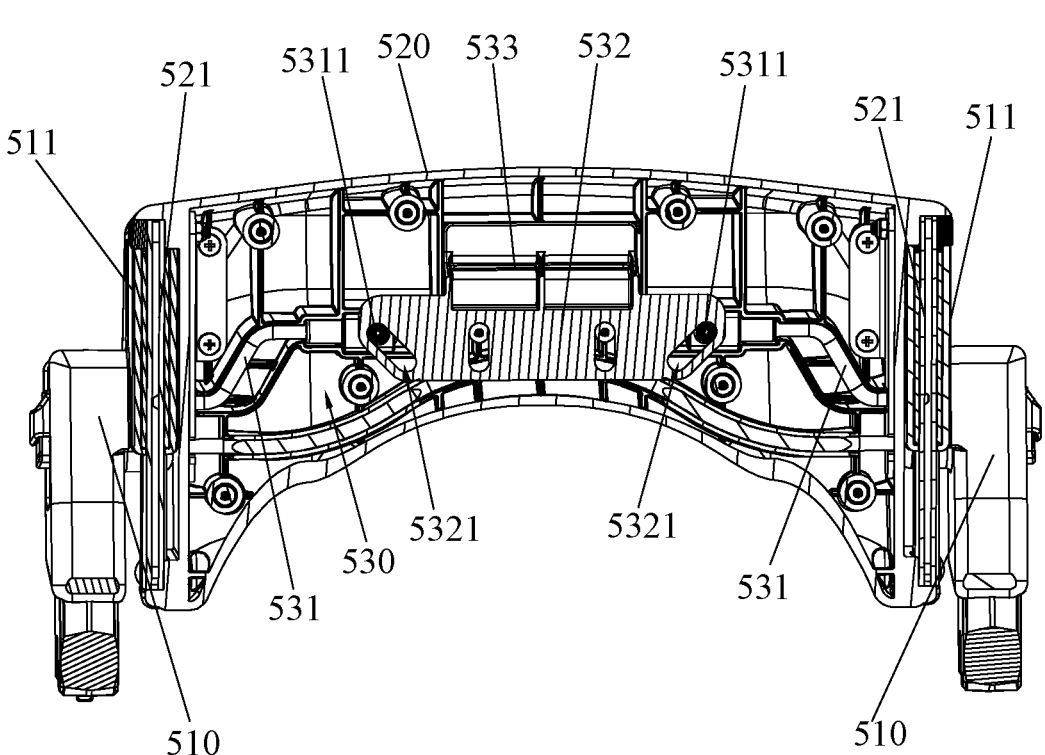
FIG. 21 is an internal structural view of the protector of the safety seat according to the fourth embodiment of the present disclosure.

Further referring to FIGS. 20 and 21, the locking mechanism 530 includes two engaging rods 531, a driving block 532, an operating member 533 and an elastic element (not shown). The engaging rods 531 are respectively slidably arranged on the sliding portion 520, the fixing seat 510 is provided with at least two engaging holes 512 along the direction ascending from back to front, and the engaging holes 512 are located on the fixing pipe. The engaging rod 531 is selectively inserted into any one of the engaging holes 512. Specifically, the driving block 532 is slidably arranged on the sliding portion 520 and has a sliding direction that is perpendicular to a sliding direction of the engaging rod 531. The driving block 532 is provided with two driving chutes 5321. Extending directions of the two driving chutes 5321 are symmetrically arranged. One end of the engaging rod 531 is fixedly provided with a sliding pin 5311. The sliding pin 5311 has a central axis that is perpendicular to a central axis of the engaging rod 531, and is slidably inserted into the driving chute 5321. The operating member 533 is connected to the driving block 532 and may pull the driving block 532 to move. The elastic element is arranged between the sliding portion 520 and the engaging rod 531, and provides an elastic force for the engaging rod 531 to be inserted into the engaging hole 512. The elastic element may be a compression spring.

When a position of the protector 500 is required to be adjusted, it is only necessary to manually pull the operating member 533, so that the operating member 533 drives the driving block 532 to move, and the driving block 532 drives the two engaging rods 531 out of the engaging holes 512 through the two driving chutes 5321 and the two sliding pins 5311. At this time, the sliding portion 520 is in an unlocked state, and may slide relative to the fixing seat 510. After that, after a position of the sliding portion 520 is adjusted, the operating member 533 is released, so that the engaging rod 531 extends into another corresponding engaging hole 512, then re-lock the sliding portion 520, and thus the adjustment can be completed.

Figure 22:
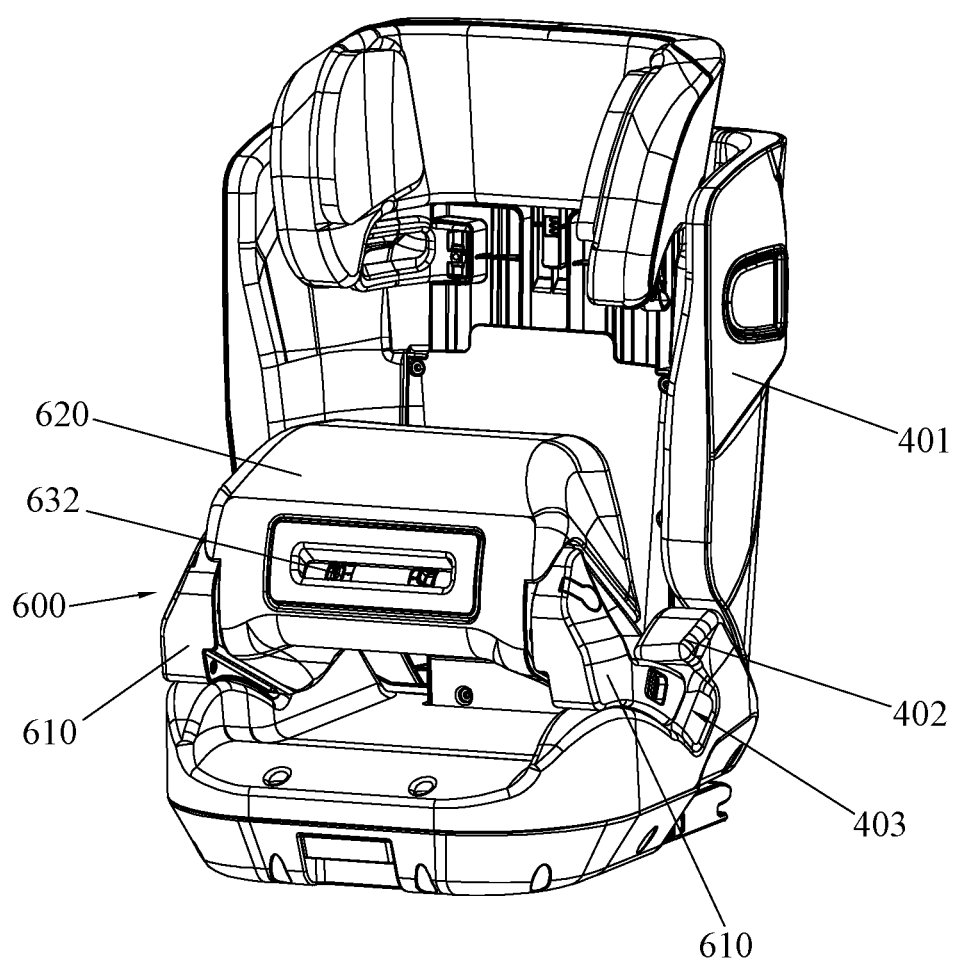
FIG. 22 is a perspective view of a safety seat according to a fifth embodiment of the present disclosure.
Figure 23:
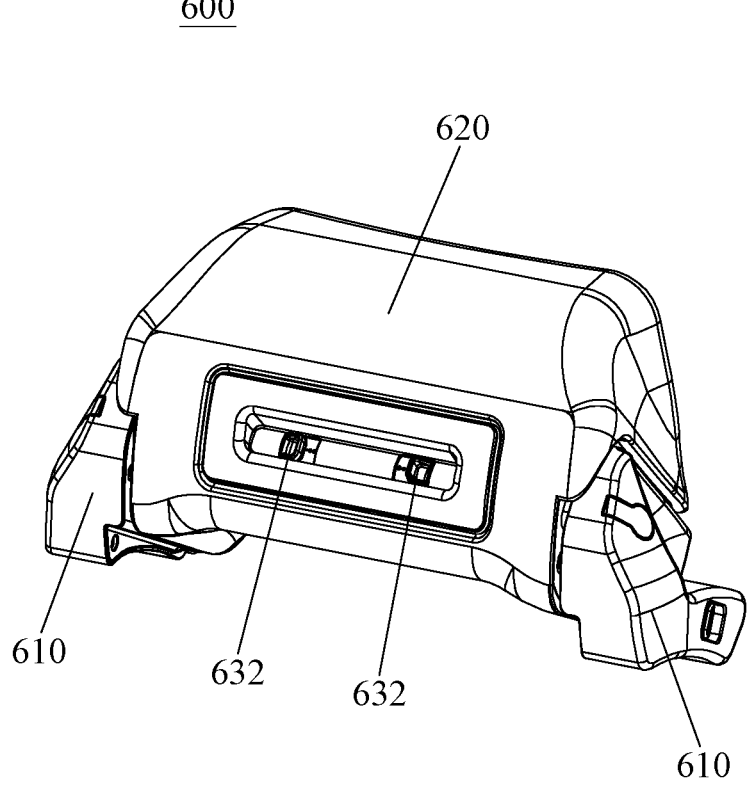
FIG. 23 is a perspective view of a protector of the safety seat according to the fifth embodiment of the present disclosure.
Figure 24:
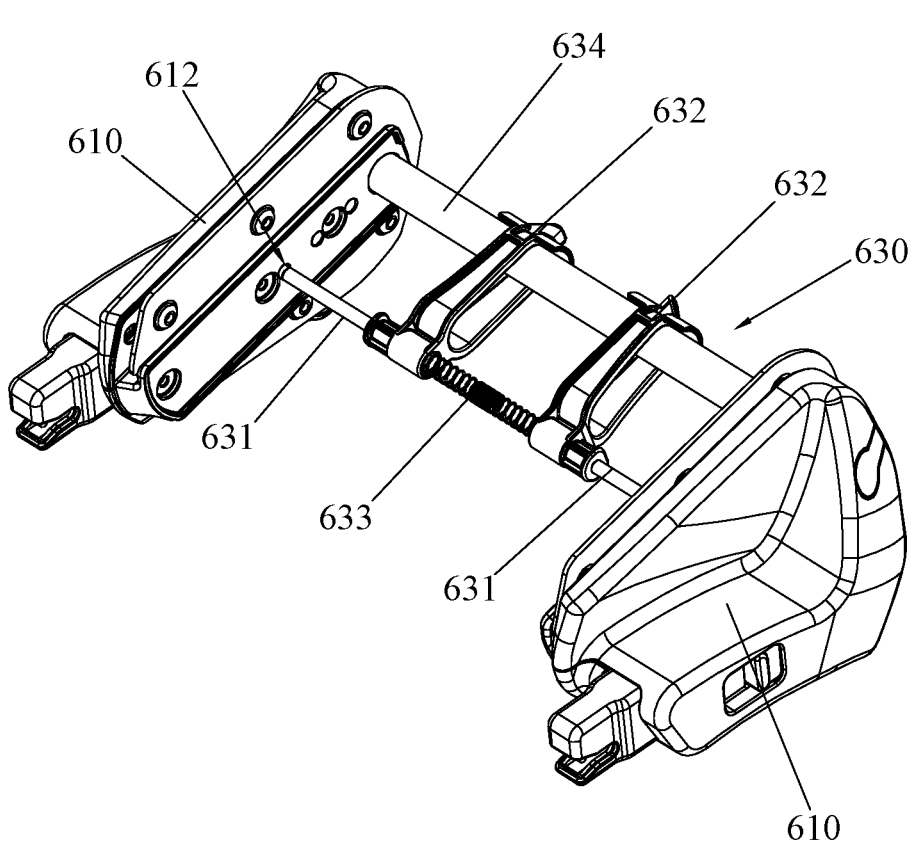
FIG. 24 is an internal structural view of the protector of the safety seat according to the fifth embodiment of the present disclosure.

As shown in FIGS. 22 to 24, a structure of an adjustable protector 600 according to a fifth embodiment of the present disclosure is shown.

The structure of the adjustable protector 600 of this embodiment is similar to that of the fourth embodiment, however, the difference lies in a locking mechanism 630. The locking mechanism 630 of this embodiment includes an engaging rod 631, an operating member 632 and an elastic element 633. The engaging rod 631 is slidably arranged on the sliding portion 620 and may extend out of the sliding portion 620. The fixing seat 610 includes at least two engaging holes 612 along a direction ascending from back to front, and the engaging rod 631 is selectively inserted into any one of the engaging holes 612. The operating member 632 is connected to the engaging rod 631, and the operating member 632 is slidably arranged in the sliding portion 620. Specifically, the sliding portion 620 includes a guide rod 634 for balancing with the engaging rod 631, and the operating member 632 is slidably sleeved on the guide rod 634. In this way, the operating member 632 can be prevented from accidentally shifting, thereby improving the structure stability. An end of the operating member 632 is exposed at a front side of the sliding portion 620 for convenient operation. The elastic element 633 is arranged between the two engaging rods 631 on the left and right sides to provide an elastic force for the engaging rods 631 to be inserted into the engaging holes 612. The elastic element 633 may enable the engaging rod 631 to be automatically inserted into the engaging hole 612, so that the sliding portion 620 may be automatically locked with the fixing seat 610, thereby improving the convenience of use. In the operation of this embodiment, it is only necessary to push the operating member 632 to drive the engaging rod 631 out of the fixing portion 610, and thus achieve the purpose of unlocking the sliding portion 620, so that the position of the sliding portion 620 can be quickly adjusted.

The embodiments as above mentioned are only preferred examples of the present disclosure, and of course, cannot be used to limit the protection scope of the present disclosure. Therefore, equivalent changes made according to the present disclosure still fall within the scope of the present disclosure.

What is claimed is:

1. An adjustable protector, comprising:
   a fixing seat;
   a sliding portion slidably arranged on the fixing seat,
   a locking mechanism arranged between the fixing seat and the sliding portion to lock or unlock the sliding portion;
   one of the fixing seat and the sliding portion is provided with a guide groove having a first major elongate surface extending along a first direction ascending from back to front on a first side surface thereof; and
   the other of the fixing seat and the sliding portion is provided with a guide rail having a second major elongate surface extending along a second direction ascending from back to front on a second side surface thereof, and the guide groove slidably fits with the guide rail,
   wherein the seat body comprises a connecting rod, and the fixing seat comprises a fastening mechanism disposed at an end of the fixing seat and configured to detachably connect to the connecting rod, and
   wherein, when the sliding portion slides forward from back to front, the sliding portion is configured to slide along an ascending direction that is parallel to the first direction and the second direction and non-parallel to a longitudinal axis of a seat body of a safety seat.

2. The adjustable protector of claim 1, wherein the guide groove is a sliding pipe, the guide rail is a fixing pipe, and the sliding pipe is slidably sleeved outside the fixing pipe.

3. The adjustable protector of claim 1, wherein the locking mechanism comprises an engaging rod slidably arranged on the sliding portion, the fixing seat comprises at least two engaging holes along a direction ascending from back to front, and the engaging rod is selectively inserted into any one of the engaging holes.

4. The adjustable protector of claim 3, wherein the locking mechanism comprises a driving block, the driving block is slidably arranged on the sliding portion and has a sliding direction intersecting with a sliding direction of the engaging rod;

the driving block comprises a driving chute, and a sliding pin is fixedly arranged on one end of the engaging rod and is slidably inserted into the driving chute.

5. The adjustable protector of claim 4, wherein the locking mechanism comprises an operating member connected to the driving block.

6. The adjustable protector of claim 4, wherein the locking mechanism comprises an elastic element which provides an elastic force for inserting the engaging rod into the engaging hole.

7. The adjustable protector of claim 3, wherein the locking mechanism comprises an operating member, and the operating member is connected to the engaging rod and is slidably arranged in the sliding portion.

8. The adjustable protector of claim 7, wherein the sliding portion comprises a guide rod, and the operating member is slidably sleeved on the guide rod.

9. A safety seat comprising a seat body and an adjustable protector, wherein the adjustable protector comprises a fixing seat, a sliding portion slidably arranged on the fixing seat, and a locking mechanism arranged between the fixing seat and the sliding portion to lock or unlock the sliding portion, and one of the fixing seat and the sliding portion is provided with a guide groove having a first major elongate surface extending along a direction ascending from back to front on a first side surface thereof, the other of the fixing seat and the sliding portion is provided with a guide rail having a second major elongate surface extending along a second direction ascending from back to front on a second side surface thereof, and the guide groove slidably fits with the guide rail, wherein the seat body comprises a connecting rod, and the fixing seat comprises a fastening mechanism disposed at an end of the fixing seat and detachably connected to the connecting rod, wherein, when the sliding portion slides forward from back to front, the sliding portion is configured to slide along an ascending direction that is parallel to the first direction and the second direction and non-parallel to a longitudinal axis of the seat body.

10. The safety seat of claim 9, wherein the fastening mechanism comprises an engaging hook, a reinforcing member and a push button, the reinforcing member is fixed on the fixing seat and comprises an opening, the engaging hook is pivotally connected to the fixing seat, and the push button is slidably arranged on the fixing seat and is capable of pushing the engaging hook to swing, so as to close or open the opening by the engaging hook.

11. The safety seat of claim 10, wherein the fastening mechanism comprises a reset elastic member arranged between the fixing seat and the locking hook and providing an elastic force for driving the locking hook to be rotated to a position of closing the opening.

* * * * *